US007399970B2

(12) United States Patent
Micko

(10) Patent No.: US 7,399,970 B2
(45) Date of Patent: Jul. 15, 2008

(54) PIR MOTION SENSOR

(75) Inventor: Eric Scott Micko, Rescue, CA (US)

(73) Assignee: Suren Systems, Ltd. (HK)

( * ) Notice: Subject to any disclaimer, the term of this patent is extended or adjusted under 35 U.S.C. 154(b) by 944 days.

(21) Appl. No.: 10/600,314

(22) Filed: Jun. 20, 2003

(65) Prior Publication Data

US 2004/0169145 A1 Sep. 2, 2004

Related U.S. Application Data

(63) Continuation-in-part of application No. 10/388,862, filed on Mar. 14, 2003.

(60) Provisional application No. 60/441,571, filed on Jan. 21, 2003.

(51) Int. Cl.
*G01J 5/08* (2006.01)

(52) U.S. Cl. .................................................... 250/342

(58) Field of Classification Search .................. 250/342
See application file for complete search history.

(56) References Cited

U.S. PATENT DOCUMENTS 3,829,693 A 8/1974 Schwartz .................... 250/338
4,864,136 A 9/1989 Behlke .................... 250/338.3
4,912,748 A 3/1990 Horii et al. .................. 250/221
5,126,718 A 6/1992 Doctor ........................ 340/567
5,313,060 A 5/1994 Gast et al. ................... 250/221
5,432,350 A 7/1995 Kuritani et al. .......... 250/388.3
5,461,231 A 10/1995 Sugtmoto et al. ........... 250/342
6,163,025 A 12/2000 Pantus ..................... 250/338.3
6,215,399 B1 4/2001 Shpater ....................... 340/567
6,239,433 B1 5/2001 Porter ..................... 250/338.3

FOREIGN PATENT DOCUMENTS

EP 0953952 11/1999
GB 2201770 9/1998

*Primary Examiner*—David P. Porta
*Assistant Examiner*—Shun Lee
(74) *Attorney, Agent, or Firm*—John L. Rogitz

(57) ABSTRACT

A passive infrared sensor uses two detectors having elements of different configurations such that each element outputs a respective frequency when an object moves in front of it. Based on the presence of two frequencies with similar peak and/or slope characteristics, a motion signal is output to, e.g., activate an alarm. In another embodiment the detectors have plural elements with the elements of one detector being wired in a dimension that is orthogonal to the dimension in which the elements of the other detector are wired. The signals from the detectors are combined to determine motion and size of object. The detector elements can also be configured differently from each other as in the first embodiment, and the polarities of signals can be used to determine direction of motion. In yet another embodiment the detectors can be of the same size but have optics of different focal lengths.

9 Claims, 5 Drawing Sheets

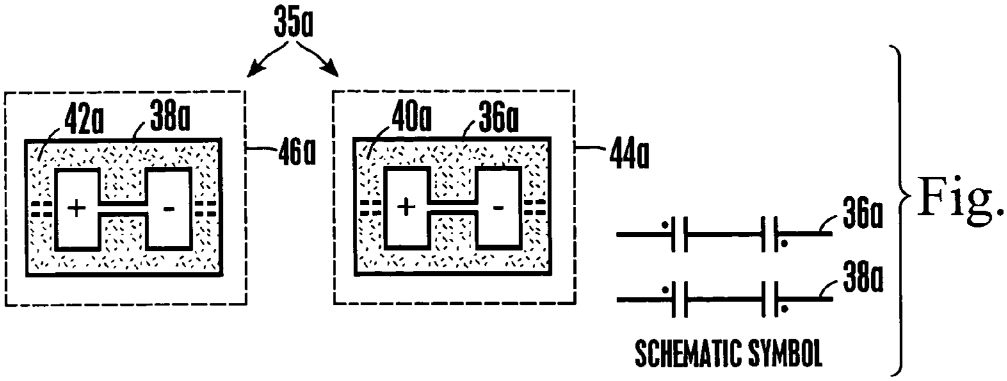
Fig. 3A
Figure 4A
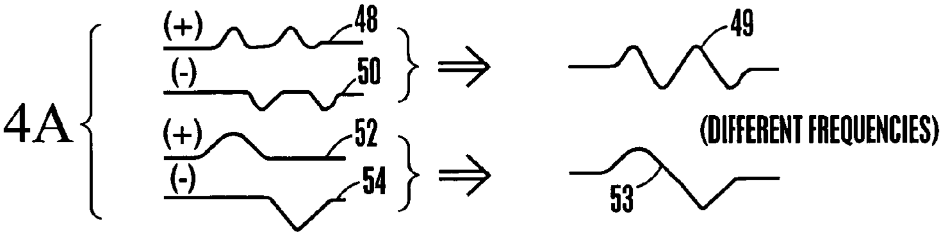
Figure 4B
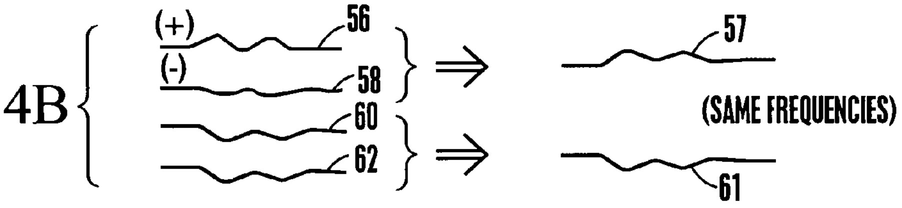
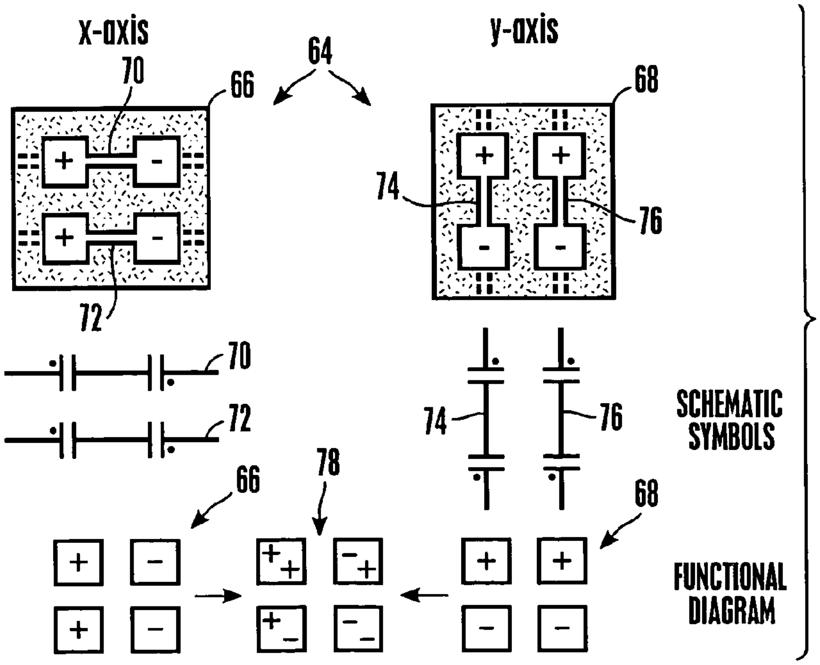
Figure 5

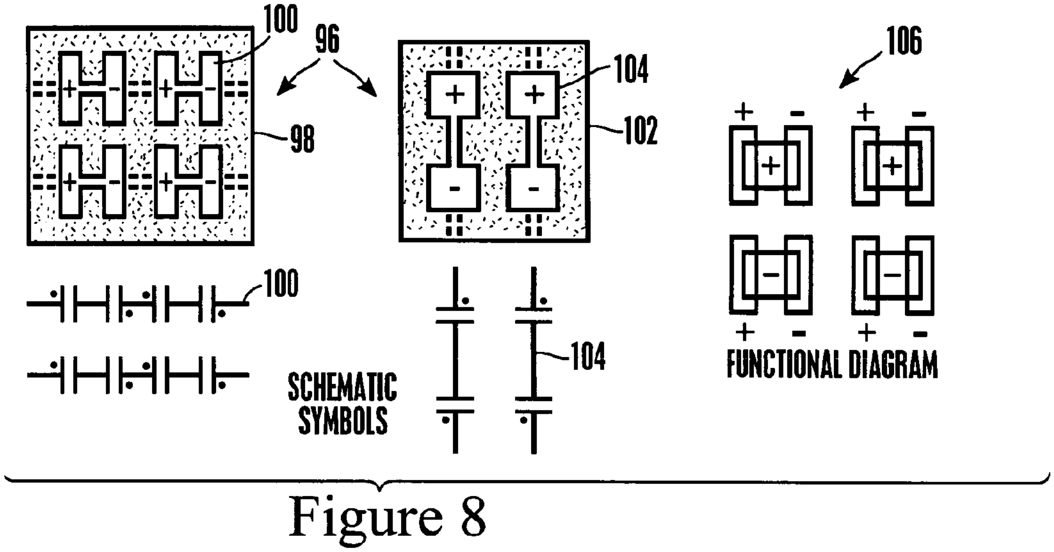
Figure 8
Figure 9
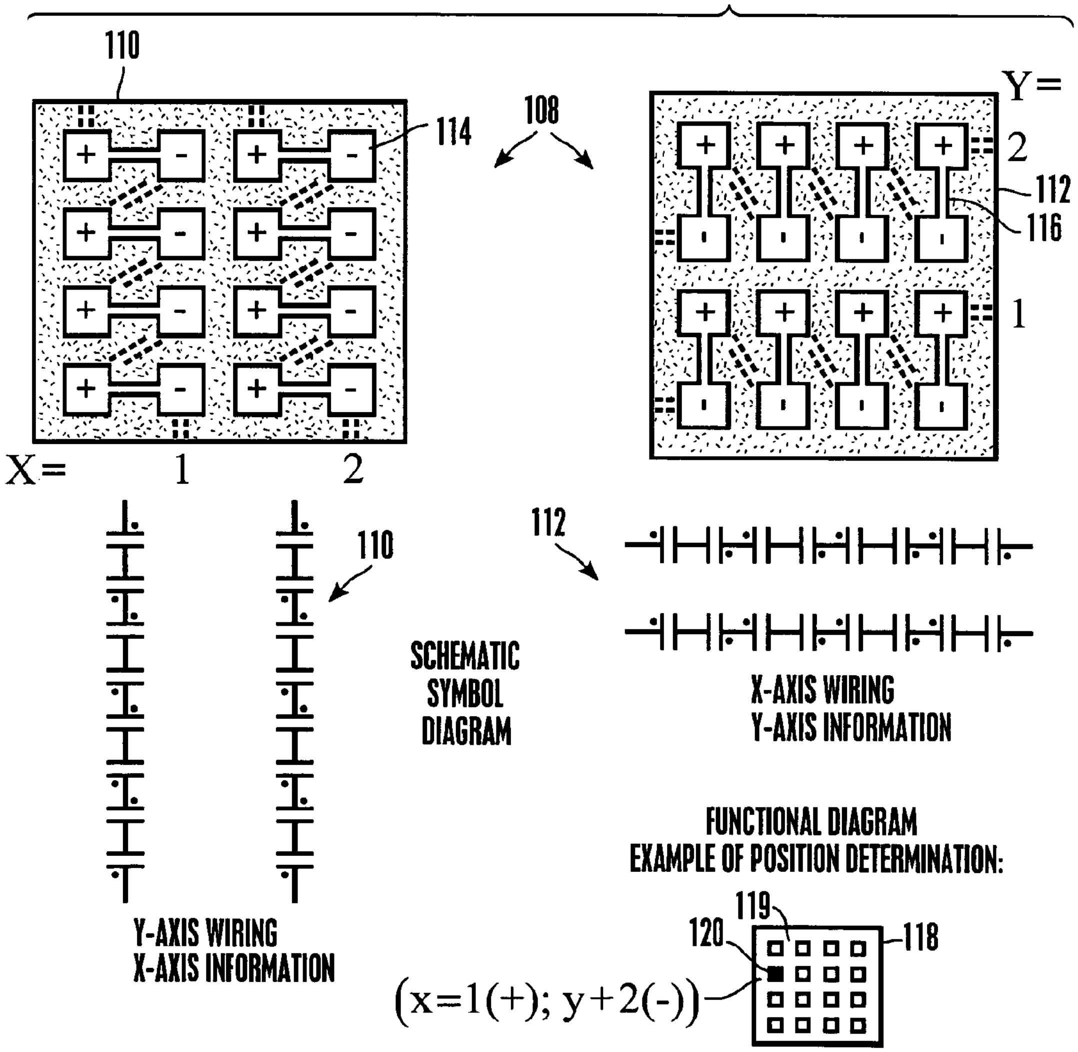

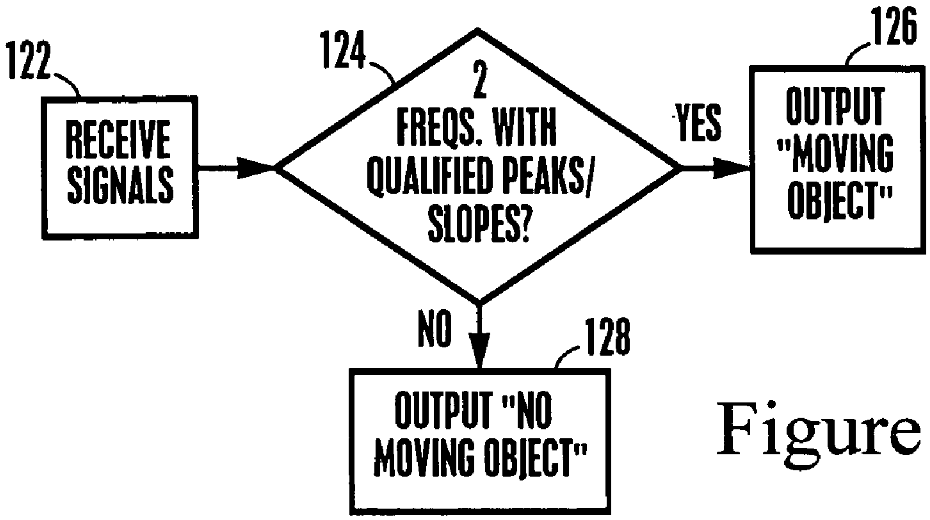
Figure 10
Figure 11
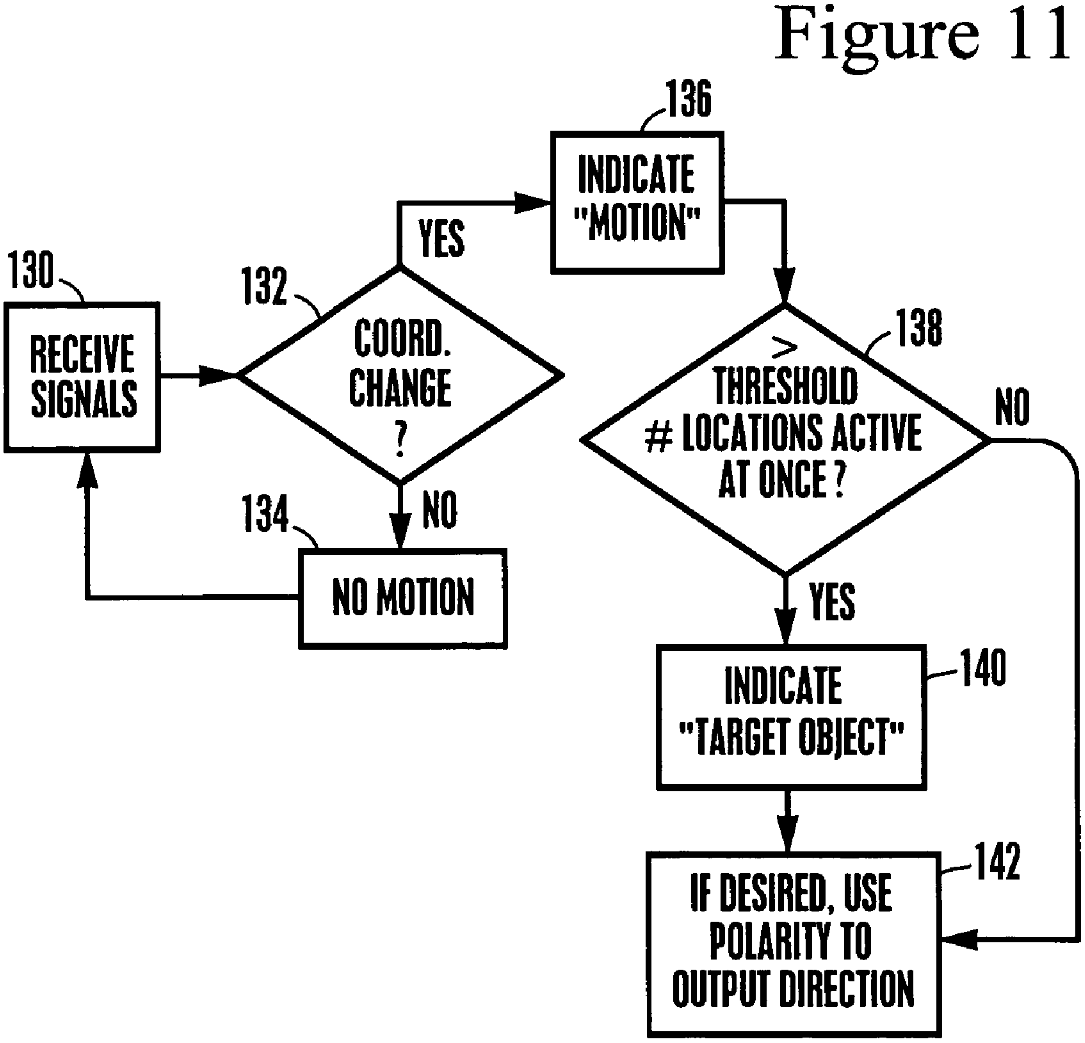

PIR MOTION SENSOR

PRIORITY CLAIM

This is a continuation-in-part of U.S. patent application Ser. No. 10/388,862, filed Mar. 14, 2003. Priority is also claimed from U.S. provisional application Ser. No. 60/441,571, filed Jan. 21, 2003.

FIELD OF THE INVENTION

The present invention relates generally to motion sensors.

BACKGROUND OF THE INVENTION

Motion sensors are used in security systems to detect movement in a monitored space. One type of sensor is a passive infrared (PIR) motion sensor, which detects changes in far infrared radiation (8-14 micron wavelength) due to temperature differences between an object (e.g. a human) and its background environment. Upon detection, motion sensors generally transmit an indication to a host system, which may in turn activate an intrusion "alarm", change room lighting, open a door, or perform some other function.

One way to provide motion sensing capabilities is to provide an infrared camera. Motion in the monitored space can be tracked easily by observing the output of the camera. However, such cameras are expensive. Hence, the need for simple, relatively inexpensive PIR motion sensors, using, e.g., simple pyroelectric detectors. Because the detectors can be a significant part of the cost (5-10%) of a typical PIR motion sensor, most PIR motion sensors employ only one or two such detectors.

To monitor a large space with only one or two detectors, a typical PIR motion sensor is designed with multiple optical components (e.g. lenses or mirrors). Each component of such "compound optics" focuses the infrared radiation from objects within a respective sub-volume of the monitored space into an image appearing over the detector. The monitored sub-volumes can be interleaved with non-monitored sub-volumes, so that a radiation producing target (e.g., a human) passing from sub-volume to sub-volume causes a "target radiation/background radiation/target radiation" pattern at the detector. In the case of humans, this pattern causes changing IR radiation at the detector.

While effective, it happens that simple PIR sensors using a minimal number of detectors can generate false alarms from time to time, due, for example, to incident radiation of wavelength outside of the 8-14 micron band. Such false alarms may nonetheless precipitate unneeded responses by, e.g., security personnel. Accordingly, to reduce the likelihood of false alarms, optical filters have been added as detector windows to screen out white light and near IR light. Also, coatings (in the case of mirrors) and additives (for lenses) have been added to prevent the focusing of white and near infrared light onto detectors to reduce the possibility of PIR motion sensors producing false alarms due top, e.g., automobile headlights shining through windows.

To further reduce the chance of false alarms, detectors can include a pair of equally sized elements of opposing polarities. Non-focussed out-of-band radiation is equally incident on both elements, thus causing the signals from the equal and opposite elements to roughly cancel one another. Further, equal elements of opposite polarity also reduce false alarms from shock and temperature change. In addition, as disclosed in, e.g., U.S. Pat. No. 6,163,025, incorporated herein by references, two pair of elements can be interleaved and separately connected to generate motion signals that are shifted in time relative to one another. This facilitates differentiation between moving targets and stationary but otherwise problematic sources such as varying-intensity white lights.

The present invention recognizes, however, that the computational requirements for processing the time-shifted signals in the '025 patent are considerable. The present invention critically recognizes the need to reduce false alarms in simple PIR sensors while minimizing processing requirements. Moreover, it is recognized herein that it is desirable that a simple PIR motion sensor be capable of discriminating smaller moving targets, e.g., animals, from larger targets such as humans, so that an alarm will be activated only in the presence of unauthorized humans, not pets. The present invention addresses one or more of these critical observations.

SUMMARY OF THE INVENTION

The invention is a generally improved passive infrared motion sensor. Improvements are realized in the rejection of interferences, and/or the determination of motion direction, and/or the rejection of signals due to moving animals of sizes significantly smaller than humans.

In the invention's first aspect, the improved sensor's opto-electronic system produces signals of two different frequencies in response to human motion. The system produces only single-frequency signals, however, in response to detector-interfering stimuli such as white light, shock, temperature change, radio-frequency electromagnetic radiation, etc. Signals are sent to the sensor's signal processing system, which uses the presence or absence of two frequencies to discriminate between moving objects and non-moving interfering stimuli. Thus, the improved sensor has a lower probability of indicating motion that is not in response to a moving object, but to an interfering stimulus. This would be called a "false alarm" in the case of motion sensors used to detect human intruders. Moreover, the sensor can determine direction of motion by evaluating waveform peak juxtapositions between the two different-frequency signals so that the sensor can be used, for example, to open a door only if a human is approaching it from a particular direction.

In the invention's second aspect, the improved sensor's opto-electronic system produces multiple signals from a two-dimensional array of sub-volumes within the space monitored by the sensor. The sensor's signal processing system uses those signals as information regarding size of the moving target, facilitating rejection of signals due to non-human (e.g. small animal) motion. If desired, both aspects can be combined to yield a sensor improved in all three areas mentioned.

Accordingly, in a first aspect a passive infrared (IR) motion sensor includes a first IR detector that outputs a first signal which has a first frequency when a moving object passes in a detection volume of the first detector. A second IR detector outputs a second signal that has a second frequency when the moving object passes in a detection volume of the second detector, and a processing system receives the first and second signals and outputs a detection signal representative of the moving object In a preferred embodiment, each detector includes at least two elements, with the elements of the first detector defining a first center-to-center spacing between themselves and the elements of the second detector defining a second center-to-center spacing between themselves. This can be achieved by making the elements of the first detector a different size than those of the second detector, and/or by configuring the first detector to have a different number of elements than the second detector.

In one non-limiting embodiment, the first and second detectors are disposed on a common substrate in a single housing. In another embodiment, the first and second detectors are housed separately from each other and the first detector monitors a first volume of space that is at least partially optically superposed with a second volume of space monitored by the second detector.

In preferred embodiments the first detector can have at least two rows of elements with at least two elements per row, and the second detector can have at least two rows of elements with at least two elements per row. A subvolume monitored by the first detector is at least partially optically superposed on a subvolume monitored by the second detector.

In another aspect, a method for discriminating a moving object in a monitored space from a non-moving object characterized by non-constant radiation includes receiving a first frequency from a first passive IR detector, and receiving a second frequency from a second passive IR detector, with the first and second frequencies not being equal. The method also includes outputting a signal indicating the presence of the moving object only if both the first and second frequencies are substantially simultaneously received. Otherwise, the signal indicating the presence of the moving object is not output.

In yet another aspect, a processing system is connected to first and second PIR detectors for outputting a detection signal only if signals received from both detectors have different frequencies from each other.

In still another aspect, a motion sensor includes a first passive IR detector having at least two rows of elements with at least two elements per row. The first passive IR detector monitors a first subvolume of space. A second passive IR detector has at least two rows of elements with at least two elements per row, and the second passive IR detector monitors a second subvolume of space. An optics system at least partially optically superposes the first and second subvolumes.

In preferred implementations of this aspect, the first IR detector outputs a first signal representative of a point or points in a first dimension and the second IR detector outputs a second signal representative of a point or points in a second dimension. The first dimension can be an x-dimension in a Cartesian coordinate system and the second dimension can be a y-dimension in the Cartesian coordinate system. Or, the dimensions can be orthogonal dimensions such as "r" and "θ" in polar coordinates.

The signals can represent plus and minus polarities, and a processor can use the polarities to determine direction of motion of an object. Also, the processor can determine active coordinates using the signals to determine at least a size of a moving object. Specifically, the processor can determine whether a number of simultaneously active coordinates is equal to a threshold and based thereon determine whether to activate an alarm.

In another aspect, a PIR sensor includes a first detector configured for outputting signals that represent at least one of at least two points along a first dimension. The first detector receives IR radiation from a first monitored sub-volume of space. A second detector is configured for outputting signals that represent at least one of at least two points along a second dimension different from the first dimension, with the second detector receiving IR radiation from a second monitored sub-volume of space that at least partially overlaps the first monitored sub-volume of space.

In an alternate embodiment a passive infrared (IR) motion sensor has a first IR detector outputting a first signal having a first frequency when a moving object passes in a detection volume of the first detector, and a second IR detector outputting a second signal having a second frequency when the moving object passes in a detection volume of the second detector, with the second frequency being different than the first. A processing system receives the first and second signals and based thereon outputs a detection signal representative of the moving object. The detectors have the same size as each other, with the first detector being provided with a first optics defining a first focal length and the second detector being provided with a second optics defining a second focal length different than the first focal length.

If desired, the first and second detectors may be housed separately from each other. In a non-limiting embodiment, each detector has two and only two respective elements with the elements being of equal size with each other and with the spacing between the elements of the first detector being the same as the spacing between the elements of the second detector.

In another aspect of this last-mentioned embodiment, a method for discriminating a moving object in a monitored space from a non-moving object characterized by non-constant radiation includes receiving a first frequency from a first passive IR detector, receiving a second frequency from a second passive IR detector, with the first and second frequencies not being equal. The detectors are of equal size and configuration but have respective optics of different focal lengths. The method includes outputting a signal indicating the presence of the moving object only if both the first and second frequencies are substantially simultaneously received, and otherwise not outputting the signal indicating the presence of the moving object.

In another aspect, a motion sensor includes a first passive IR detector having two and only two elements defining a first spacing therebetween. The first passive IR detector monitors a first subvolume of space. A second passive IR detector has two and only two elements defining a second spacing therebetween. The second spacing is equal to the first spacing and all four elements have the same size as each other. The second passive IR detector monitors a second subvolume of space. An optics system at least partially optically superposes the first and second subvolumes. The optics system defines a first focal length associated with the first detector and a second focal length associated with the second detector. The first and second focal lengths are not equal to each other.

The details of the present invention, both as to its structure and operation, can best be understood in reference to the accompanying drawings, in which like reference numerals refer to like parts, and in which:

BRIEF DESCRIPTION OF THE DRAWINGS

FIG. 3*a* is a schematic diagram of an alternate embodiment of the second sensor embodiment shown in FIG. 3 that achieves the same functional diagram but that has equally-sized detectors with optics of different focal lengths, showing a plan view of the detectors along with symbol diagrams of the sensor;

FIG. 4 are graphs of signals generated by the sensors of FIGS. 2 and 3;

FIG. 5 is a schematic diagram of a third sensor embodiment with detectors in separate housings wired in orthogonal dimensions, showing a plan view of the detectors, along with symbol and functional diagrams of the sensor;

FIG. 8 is a schematic diagram of another implementation of the fourth sensor embodiment with differently-sized detectors in separate housings wired in orthogonal dimensions, showing a plan view of the detectors along with symbol and functional diagrams of the sensor;

FIG. 9 is a schematic diagram of still another implementation of the fourth sensor embodiment with differently-sized detectors in separate housings wired in orthogonal dimensions, showing a plan view of the detectors, along with symbol and functional diagrams of the sensor;

FIG. 10 is a flow chart of the logic for using plural frequencies to obtain an output representative of a moving object; and FIG. 11 is a flow chart of the logic for using the two dimensional sensors of FIGS. 5-9 to obtain an output representative of a moving object.

DETAILED DESCRIPTION OF THE PREFERRED EMBODIMENT

Figure 1:
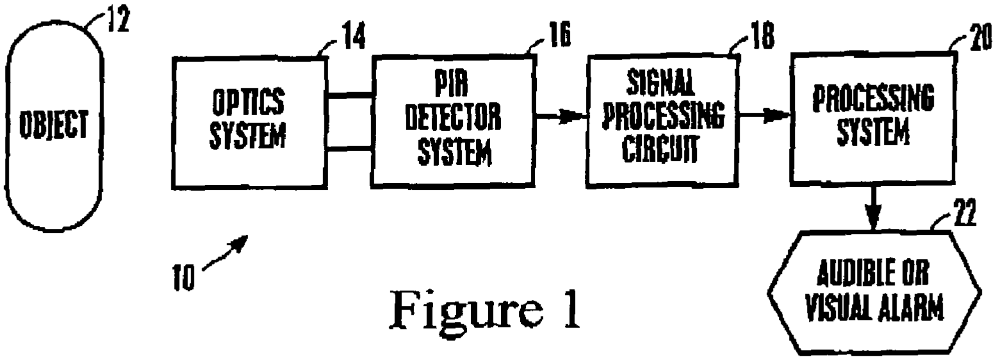
FIG. 1 is a block diagram of the present system architecture.

Referring initially to FIG. 1, a system is shown, generally designated 10, for detecting a moving object 12, such as a human. The system 10 includes an optics system 14 that can include appropriate mirrors, lenses, and other components known in the art for focussing images of the object 12 onto a passive infrared (PIR) detector system 16. The disclosure below discusses various embodiments of the PIR detector system 16. In response to the moving object 12, the PIR detector system 16 generates a signal that can be filtered, amplified, and digitized by a signal processing circuit 18, with a processing system 20 (such as, e.g., a computer or application specific integrated circuit) receiving the signal and determining whether to activate an audible or visual alarm 22 or other output device such as an activation system for a door, etc. in accordance with the flow charts herein.

Figure 2:
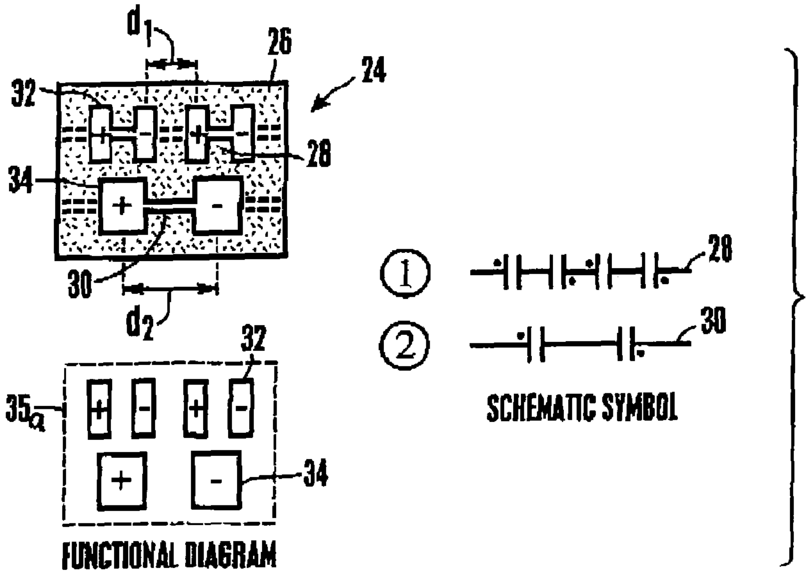
FIG. 2 is a schematic diagram of a first sensor embodiment with differently-sized detectors on the same substrate in one housing, showing a plan view of the detectors along with symbol and functional diagrams of the sensor.

Having described the overall system architecture, reference is now made to FIG. 2, which shows a first exemplary embodiment of the PIR sensor of the present invention. As shown, IR detection means for a PIR sensor 24 can include a single, preferably ceramic substrate 26 on which are formed first and second PIR detectors 28, 30. In the embodiment shown in FIG. 2, the first detector 28 has four, elements 32 (two pair of plus and minus polarity elements electrically connected together) and the second detector 30 has two elements 34 (one pair of plus and minus polarity elements), with each pair of elements 32, 34 being joined by an electrical connection, roughly forming an "H". It is to be understood that the detectors 28, 30 include, on the reverse side of the substrate 26 from that shown, complementary components (e.g. "plates" as explained below) which, together with those shown, form the elements 32, 34. Connections among these reverse-side plates are depicted by dashed lines.

The detectors 28, 30 can be pyroelectric detectors that measure changes in far infrared radiation. Such detectors operate by the "piezoelectric effect", which causes electrical charge migration in the presence of mechanical strain. Pyroelectric detectors take the form of a capacitor—two electrically conductive plates separated by a dielectric. The dielectric is often a piezoelectric ceramic, and is referred to herein as a "substrate". When far infrared radiation causes a temperature change (and thus some mechanical strain) in the ceramic, electrical charge migrates from one plate to the other. If no external circuit is connected to the detector, then a voltage appears as the "capacitor" charges. If an external circuit is connected between the plates, then a current flows.

In accordance with present principles, the center-to-center spacing "d1" between adjacent elements 32 of the first detector 28 is less than the center-to-center spacing "d2" between adjacent elements 34 of the second detector 30. This difference can be achieved as shown in FIG. 2 by making the elements 34 of the second detector 30 larger than the elements 32 of the first detector 28. It can also be achieved by spacing the second detector elements 34 further apart than the first detector elements 32, and/or by providing fewer second detector elements 34 than first detector elements 32.

FIG. 2 also shows a functional diagram of the detectors 28, 30 with elements 32, 34 in accordance with pyroclcctric detector principles summarized above, indicating the relative sizes, shapes, and polarities of the subvolumes monitored by the sensor (i.e., a projection of the sizes, shapes, and polarities of the elements) and illustrating that both detectors 28, 30 are mounted in a single housing 35*a*. Also, FIG. 2 shows a schematic symbol diagram representing the elements 32, 34 of the detectors 28, 30 as capacitors with the dots indicating polarity.

Figure 3:
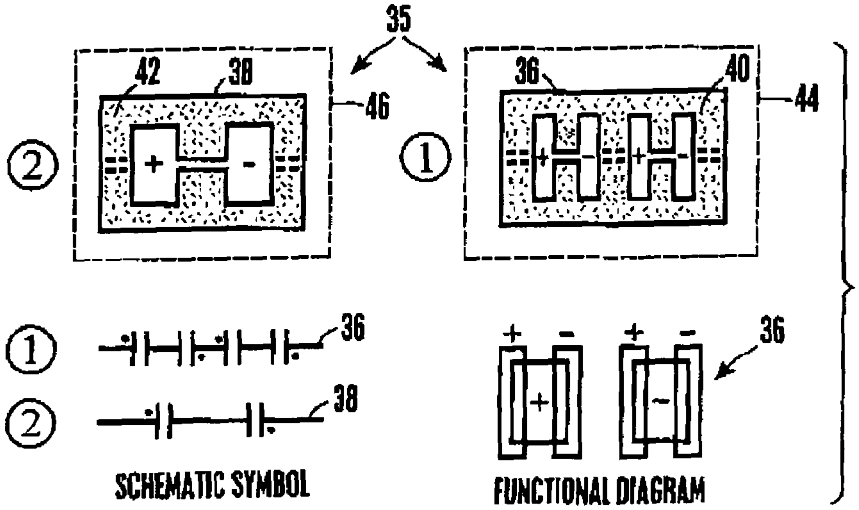
FIG. 3 is a schematic diagram of a second sensor embodiment with two detectors in separate housings, showing a plan view of the detectors along with symbol and functional diagrams of the sensor.

FIG. 3 shows IR detection means for a PIR sensor 35 that has first and second detectors 36, 38 that are in all essential respects identical in configuration to the detectors 28, 30 shown in FIG. 2, except that each detector 36, 38 is mounted on its own respective substrate 40, 42. The substrates 40, 42 can be contained in respective housings 44, 46. According to the embodiment shown in FIG. 3, the optics system 14 (FIG. 1) is arranged such that two preferably dissimilar space sub-volumes are respectively monitored by the detectors 36, 38 and such that the two sub-volumes are optically superposed with each other behind similar optical components. Essentially, combinations of optical components of compound optics are selected such that both detectors' monitored sub-volumes occupy at least portions of the same space.

In contrast to the embodiment shown in FIG. 2, the sensor of FIG. 3 produces two signal frequencies regardless of image size, due to complete functional overlapping of unequal-size elements. It thus has less dependence on object size to generate a detection than does the sensor shown in FIG. 2, which requires that the object be sufficiently large to appear in both monitored sub-volumes.

FIG. 3 also includes a functional diagram illustrating the aspect ratios and juxtaposition of the longitudinal cross-sections of the two sets of monitored sub-volumes. If desired, the two sets of detectors could be wired together to provide a combined signal, which would reduce the number of amplifiers needed in the sensor, at the cost of additional signal processing to separate the two frequencies.

FIG. 3*a* shows an additional detector arrangement that achieves the same functional diagram shown in FIG. 3. A PIR sensor 35*a* has first and second detectors 36*a*, 38*a* that are in all essential respects identical in size and configuration to each other, with each detector 36*a*, 38*a* being mounted on its own respective substrate 40*a*, 42*a*. The substrates 40*a*, 42*a* can be contained in respective housings 44*a*, 46*a*. Each detector 36*a*, 38*a* has two and only two elements (minus and plus) as shown, and all four elements shown in FIG. 3*a* are of equal size, with the spacing between the elements of the first detector 36*a* being the same as the spacing between the elements of the second detector 38*a*.

According to the embodiment shown in FIG. 3*a*, the detectors 36*a*, 38*a* are provided with respective optics within the optics system 14 that have different focal lengths. In the case where, e.g., the focal length ratio is 2:1, the optics are compound, and the optics associated with the detector 36*a* can have twice the number of optical elements as the optics associated with the detector 38*a*. The optics of the detectors 36*a*, 38*a* are arranged such that both detectors' monitored sub-volumes occupy at least portions of the same space.

FIG. 4 illustrates the signals that are output by the sensors shown in FIGS. 2 and 3. For simplicity, reference to the detectors 36, 38 shown in FIG. 3 will be made. The top two signals 48, 50 in signal set (a) are output by separate elements of the first detector 36 in the presence of motion of a human through the sub-volumes monitored by the detectors, while the signals 52, 54 in signal set (a) are output by separate elements of the second detector 38 in the presence of a moving human. As shown, the frequency of the element-summed detector output signal 49 is different than (and in the example shown is higher than) the frequency of the element-summed detector output signal 53. When the center-to-center spacings bear a 2:1 ratio, the frequencies of the respective detector output signals likewise bear a 2:1 ratio. Moreover, the first peak of the first detector high frequency signal 49 is substantially simultaneous in time with the maximum positive slope of the second detector low frequency signal 52, in the presence of a moving object. A moving object can be identified by identifying these characteristics (and similar subsequent characteristics of different peak/slope polarity) as being present.

In contrast, signal set (b) (reference numerals 56, 58, 60, 62) represents the detector outputs in response to varying-intensity non-focused white light from a stationary source. These signals arise because the responses of the "equal" and opposite elements onLy roughly cancel each other. As can be appreciated in reference to FIG. 4, under these circumstances the frequencies of the element-summed signal 57 and 61 that are respectively output by the defectors 36, 38 are equal and, hence easily discriminated from the dual-frequency signals in set (a), thereby reducing the probability of false alarms arising from such varying-intensity non-focused white light.

Moreover, from the pattern of signals generated by the two detectors 36, 38, the direction of motion of the human object 12 can be determined from the polarity pattern of the signal waveform peaks. For example, as alluded to above and referring to the functional diagram of FIG. 3, a moving object 12 entering the larger (+) monitored sub-volume from its left side causes simultaneously a (+) signal slope from the corresponding detector element, and a (+) signal peak from the element corresponding to the left-hand (+) smaller overlapping sub-volume. By continuing in the same direction within the larger (+) monitored sub-volume, the target then causes a (+) signal peak from the corresponding detector element. Still continuing, within the same larger (+) monitored sub-volume, the target causes simultaneously a (−) signal slope from the corresponding detector element, and a (−) signal peak from the element corresponding to the right-hand (−) smaller overlapping sub-volume. In the foregoing case, the simultaneous signal slopes and peaks of matching polarity indicate one direction of motion, whereas slopes and peaks of non-matching polarity indicate the opposite direction of motion. Using the above-disclosed signal sequence principles, the direction of object motion can be ascertained.

Now referring to FIG. 5, another embodiment of the present improved PIR motion sensor can be seen. As shown, IR detection means for a PIR sensor 64 includes a first detector 66 and a second detector 68. The detectors 66, 68 may be mounted in separate housings. As shown in both the top plan detector view and the schematic symbol diagram, the first detector 66 has two pair of dual-polarity elements 70, 72 that are wired along the x-axis, while the second detector 68 has two pair of dual-polarity elements 74, 76 that are wired along the y-axis. Each pair of dual-polarity elements 70-74 establishes a row of elements. With this configuration, the first detector 66 outputs a signal that is representative of motion in a first dimension (such as, e.g., the y-dimension in a Cartesian system or the radial dimension in a polar system) and the second detector 68 outputs a signal representative of motion in a second dimension (e.g., the x-dimension in a Cartesian system or the angular dimension in a polar system) that is orthogonal to the first dimension.

According to the invention shown in FIG. 5, the sub-volumes of space monitored by the detectors 66, 68 are optically superposed by appropriately configuring the optics system 14 (FIG. 1). With this arrangement, the sensor 64 shown in FIG. 5 establishes a two-dimensional array of pyroelectric detector-monitored sub-volumes that is formed by optical superposition of monitored space sub-volumes resulting from mounting two detectors 66, 68 with orthogonal element wirings behind similar optical components. In other words, the optics system 14 causes both detectors' monitored sub-volumes to occupy the same space, as shown in the functional diagram by the virtual composite detector 78. A moving object can be discriminated from varying intensity white light because movement causes a succession of signals to be generated across the coordinate system, whereas varying white light does not. Stated differently, a location in two-dimensional space is defined by the simultaneous signals from the detectors 66, 68, and when the signals, over time, indicate a change in coordinates, motion of the object is implied. The processing system simply correlates such changes in coordinates to movement to, e.g., activate the alarm when motion is so detected.

As can be appreciated looking at the virtual composite detector 78 in the functional diagram of FIG. 5, by examining the polarities of signals that are simultaneously received from the detectors 66, 68, the position of the object 12 can be determined, in this case, as a confirmation to the coordinate location provided by simultaneous signals from particular coordinates. Specifically, two plus polarity signals indicate that the object is in the upper left quadrant of the overlapping sub-volumes, whereas two minus polarity signals indicate that the object is in the lower right quadrant of the overlapping sub-volumes. On the other hand, a minus polarity signal from the first detector 66, when arriving with a plus polarity signal from the second detector 68, indicates that the object is in the upper right quadrant, and so on. It will readily be appreciated that the principles advanced herein can be applied to arrays greater than 2×2.

Figure 6:
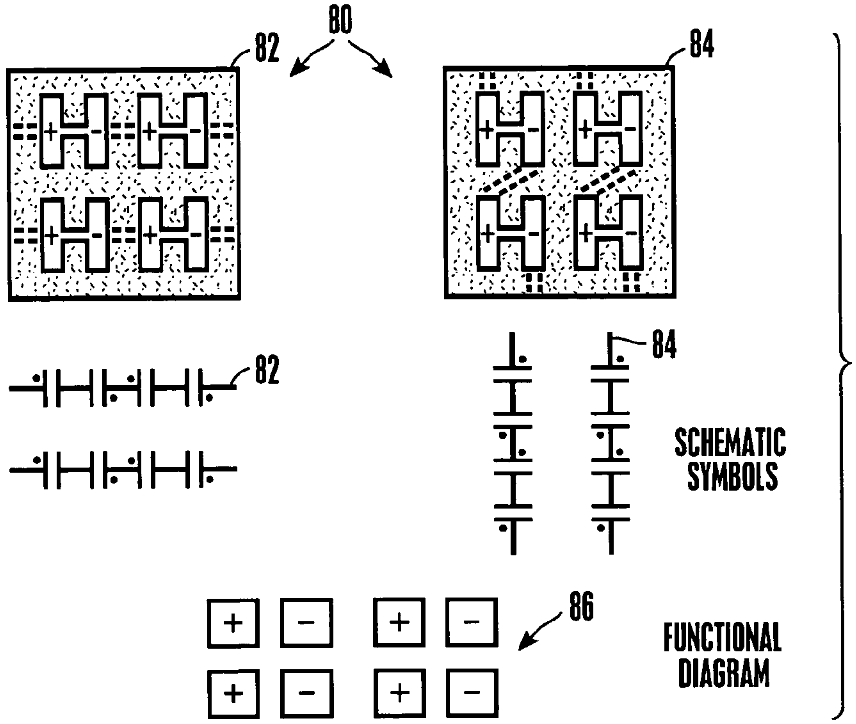
FIG. 6 is a schematic diagram of another implementation of the third sensor embodiment with detectors in separate housings wired in orthogonal dimensions, showing a plan view of the detectors, along with symbol and functional diagrams of the sensor.

For instance, FIG. 6 shows IR detection means for a PIR sensor 80 that includes first and second eight-element detectors 82, 84 that, except for the number of elements, is substantially identical to the sensor 64 shown in FIG. 5. As was the case for the sensor 64, for the sensor 80 shown in FIG. 6 the sub-volumes of the detectors 82, 84 are optically superposed so that the respective monitored sub-volumes occupy the same space to render the virtual composite detector 86 shown in the functional diagram.

Both sensors 64, 80 shown in FIGS. 5 and 6 provide two simultaneous signals ("x" and "y" in Cartesian coordinates) as a moving object 12 moves through the monitored sub-volumes. The object 12 will activate one coordinate in each detector at a time, so that by taking the "x" and "y" signals together, the location of the object 12 can be determined. It will readily be appreciated that the sensor 80 shown in FIG. 6 has higher resolution than the sensor 64 shown in FIG. 5. Still further, if the polarity of the signals is taken into account, additional positional resolution can be obtained, in accordance with principles discussed above.

Both sensors 64, 80 shown in FIGS. 5 and 6 can use an optics system 14 that optically scales human-shape images such that when the object 12 is a human, signals from two or more (x,y) locations in the array will be generated at once, whereas smaller objects such as animals, would induce simultaneous signals from fewer (x,y) locations. In this way, the number of array locations from which signals are simultaneously received can be correlated to an object size, to discriminate, e.g., pets from humans and cause an alarm to be activated only in the presence of the latter, or to open a door only in the presence of the latter, etc.

Figure 7:
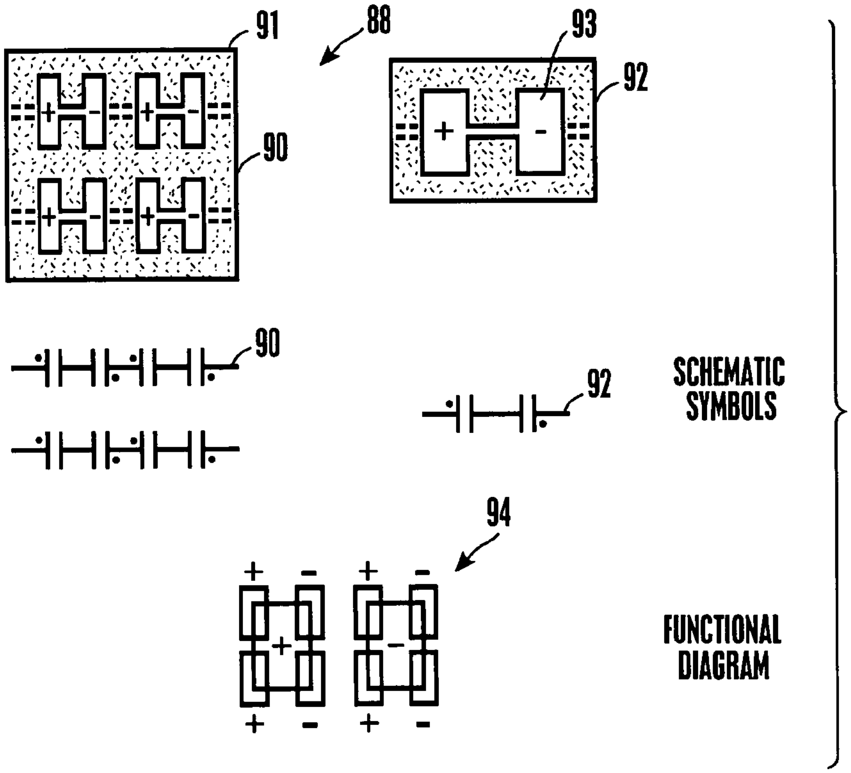
FIG. 7 is a schematic diagram of a fourth sensor embodiment with differently-sized detectors in separate housings wired in orthogonal dimensions, showing a plan view of the detectors, along with symbol and functional diagrams of the sensor.

FIG. 7 shows that the dual frequency concept of the sensors shown in FIGS. 2 and 3 can be combined with the two-dimensional array concept of the sensors shown in FIGS. 5 and 6 both to discriminate moving objects from non-moving objects on the basis of the number of frequencies received, and to determine direction of motion, and to discriminate among moving objects on the basis of size (number of array points simultaneously activated). Specifically, IR detection means for a sensor 88 can include a first detector 90 having elements 91 of one size and a second detector 92 having elements 93 of a different (in this case, larger) size, such that the frequency of the signals generated by the first detector 90 is different from the frequency of the signals generated by the second detector 92 for moving objects. Essentially, as shown by the virtual composite detector 94 in the functional diagram, the sensor 88 establishes a 2×2 array of monitored sub-volumes that is created by optical superposition of the sub-volumes monitored by the detectors 90, 92. The larger detector elements 93 establish an "x" coordinate by polarity, i.e., as shown a signal from the negative polarity element indicates a rightward "x" coordinate while a signal from the positive polarity element 93 indicates a leftward "x" coordinate. A motion-caused signal from each element of the array is identifiable as the simultaneous occurrence of wave peaks from an x-axis element along with twice as many wave peaks (i.e. occurring at twice the frequency) from a y-axis element.

FIG. 8 shows yet another IR detection means for a sensor 96 that includes a first detector 98 having two rows of two dual-polarity element pairs 100 wired along the x-axis to produce signals representing "y" coordinates and a second detector 102 having two rows of single dual-polarity element pairs 104 wired along the y-axis to produce signals representing "x" coordinates. The element pairs 100 of the first detector 98 are smaller than the element pairs 104 of the second detector 102, such that the frequency of the signals generated by the first detector 98 is different from the frequency of the signals generated by the second detector 102 for moving objects. The monitored sub-volumes are optically superposed to establish the virtual composite detector 106 shown in the functional diagram. This two-dimensional detector array provides greater position resolution than the sensor 88 shown in FIG. 7.

FIG. 9 illustrates IR detection means for a sensor 108 that is in all essential respects identical to the sensor 64 shown in FIG. 5, in that it has first and second detectors 110, 112 having respective elements 114, 116 of equal size and orthogonal wiring, except that the sensor 108 shown in FIG. 9 has eight dual-polarity element pairs per detector. The elements 114 of the first detector 110 are arranged in two vertical rows that are wired in the y-dimension by connecting the minus polarity element of a pair to the positive polarity element of the pair immediately below. On the other hand, the elements 116 of the second detector 112 are arranged in two horizontal rows that are wired in the x-dimension by connecting the minus polarity element of a pair to the positive polarity element of the pair immediately to the left. As indicated by the schematic symbol diagram, the y-dimension wired element pairs 114 of the first detector 110 provide x-dimension position information, while the x-dimension wired element pairs 116 of the second detector 112 provide y-dimension position information. To find position information, as illustrated by the virtual composite detector 118 in the functional diagram, the position of the object is indicated as in quadrant 119 in two-dimensional space (x=1, y=2) from which signals are simultaneously received, and as the point 120 by signal polarities (x=plus, y=minus). Also, moving objects are discriminated from non-moving interfering light by observing the sequential activation of points in the virtual composite detector 118.

Now referring to FIG. 10, an exemplary logic flow chart for using different frequencies from the sensors shown in FIGS. 2, 3, 7, and 8 can be seen. Commencing at block 122, signals from the two detectors are received in, e.g., a clock cycle. Moving to decision diamond 124 it is determined whether the signals are of two different frequencies and, if desired, whether the first peak of the signal from the first detector temporally coincides with the maximum slope of the signal from the second detector. Peaks and slopes can also be compared if desired for matching within user-defined criteria. If two frequencies are detected and, if desired, the peaks/slopes coincide in time and/or the peaks and slopes match defined criteria, "moving object" is output at state 126. Otherwise, "no moving object" is output at state 128.

It is to be understood that by "frequency" is meant not only the frequency of a sinusoidal-shaped signal that is typically generated when an object moves in a single direction at a constant speed across the monitored sub-volumes, but also the frequency of non-sinusoidal shaped or semi-sinusoidal shaped signals that essentially appear as pulses when, e.g., a person randomly moves in various directions and at various speeds through the monitored sub-volumes. In the latter case, more pulses per unit time, whether sinusoidal-shaped or not, are generated by the detector having the closer center-to-center element spacing Than the number of pulses per unit time generated by the detector having the greater center-to-center element spacing. "Frequency" thus encompasses pulses or peaks per unit time.

FIG. 11 shows the logic by which signals from the two-dimensional sensors shown in FIGS. 5-9 may be used to determine whether an object is moving. The signals from the two detectors of a sensor are received at block 130, and by determining, at decision diamond 132, that the coordinates of an object have changed within, e.g., a predetermined period of time, movement is indicated at block 136. Otherwise, no movement is indicated at block 134 and the logic loops back to block 130.

In addition to determining motion, the logic, for certain of the sensors disclosed herein, may proceed to decision diamond 138 to determine whether at least a threshold number of coordinates are active at once. In ocher words, it is determined whether a threshold number of signals are simultaneously received from plural elements of the detectors, indicating a moving object that equals or exceeds a predetermined size. Generally, larger moving objects are human in response to whom it is typically desired to activate the alarm, open a door, or take some other action, whereas smaller moving objects typically are pets for whom no action generally is to be taken. Accordingly, for a larger object as determined at decision diamond 138, the logic moves to block 140 to indicate "target object" and, e.g., activate the alarm 22. On the other hand, if the object is not of sufficiently large size, no action will be taken.

Block 142 further indicates that the polarity of the signals can be used as discussed above to determine the direction of motion, regardless of object size if desired. In some cases it might be desirable to take action (such as activating the alarm 22 or opening a door) not just in the presence of a large moving object, but in the presence of a large moving object that is moving in a predetermined direction. Under these conditions, a signal might generated indicating some predetermined action to be taken only after the determination at block 142 indicates that a large moving object is indeed moving in the predetermined direction.

It may now be appreciated that the sensors discussed above discriminate interfering white light from moving objects, as well as, in certain embodiments, discriminate moving objects from each other essentially based on object size. Also, one or more of the sensors discussed above can provide rough determinations of direction of object motion.

While the particular IMPROVED PIR MOTION SENSOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconciliable with the present specification and file history.

What is claimed is:

1. A passive infrared (IR) motion sensor, comprising:

at least a first IR detector outputting a first signal having a first frequency when a moving object passes in a detection volume of the first detector;

at least a second IR detector outputting a second signal having a second frequency when the moving object passes in a detection volume of the second detector, the second frequency being different than the first; and a processing system receiving the first and second signals and at least partially based on the first and second signals, outputting a detection signal representative of the moving object, wherein the detectors have the same size as each other, the first detector being provided with a first optics defining a first focal length and the second detector being provided with a second optics defining a second focal length different than the first focal length, the second detector not having an optics of the same focal length as the first optics.

2. The sensor of claim 1, wherein the first and second detectors are housed separately from each other and the first detector monitors a first volume of space that is at least partially optically superposed with a second volume of space monitored by the second detector.

3. The sensor of claim 1, wherein each detector has two said only two respective elements with the elements being of equal size with each other and with the spacing between the elements of the first detector being the same as the spacing between the elements of the second detector.

4. A method for discriminating a moving object in a monitored space from a non-moving object characterized by non-constant radiation, comprising:

receiving a first frequency from a first passive IR detector;

receiving a second frequency from a second passive IR detector, the first and second frequencies not being equal, the detectors being of equal size and configuration but having respective optics of different focal lengths such that the first detector has no optics of the same focal length as any optics of the second detector; and outputting a signal indicating the presence of the moving object only if both the first and second frequencies are substantially simultaneously received, and otherwise not outputting the signal indicating the presence of the moving object.

5. The method of claim 4, comprising arranging the detectors in respective separate housings.

6. The method of claim 4, comprising optically superposing a first volume of space monitored by the first detector with a second volume of space monitored by the second detector.

7. The method of claim 4, wherein each detector has two and only two respective elements with die elements being of equal size with each other and with the spacing between the elements of the first detector being the same as the spacing between the elements of the second detector.

8. A motion sensor, comprising:

at least a first passive IR detector having two and only two elements defining a first spacing therebetween, the first passive IR detector monitoring a first subvolume of space;

at least a second passive IR detector having two and only two elements defining a second spacing therebetween, the second spacing being equal to the first spacing and all four elements having the same size as each other, the second passive IR detector monitoring a second subvolume of space; and an optics system at least partially optically superposing the first and second subvolumes, the optics system defining a first focal length associated with the first detector and a second focal length associated with the second detector but not with the first detector, the first and second focal lengths not being equal to each other.

9. The sensor of claim 8, further comprising a processor receiving signals from the detectors.

* * * * *